United States Patent
Almond et al.

(10) Patent No.: US 9,896,738 B2
(45) Date of Patent: Feb. 20, 2018

(54) PROCESS FOR DISSOLVING ALUMINUM FOR RECOVERING NUCLEAR FUEL

(71) Applicant: Savannah River Nuclear Solutions, LLC, Aiken, SC (US)

(72) Inventors: Philip M. Almond, Martinez, GA (US); William E. Daniel, N. Augusta, SC (US); Tracy S. Rudisill, N. Augusta, SC (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 378 days.

(21) Appl. No.: 14/724,085

(22) Filed: May 28, 2015

(65) Prior Publication Data

US 2016/0348210 A1    Dec. 1, 2016

(51) Int. Cl.
*C22B 21/00* (2006.01)
*G21C 19/44* (2006.01)

(52) U.S. Cl.
CPC ...... *C22B 21/0023* (2013.01); *C22B 21/0061* (2013.01); *G21C 19/44* (2013.01); *Y02W 30/882* (2015.05)

(58) Field of Classification Search
CPC . C22B 21/0023; C22B 21/0061; G21C 19/44; Y02W 30/882
USPC .............................. 423/4, 20, 132
See application file for complete search history.

(56) References Cited

U.S. PATENT DOCUMENTS

| | | | |
|---|---|---|---|
| 3,086,926 A * | 4/1963 | Helton | G21C 19/44 205/562 |
| 3,119,658 A | 1/1964 | Schultz | |
| 3,222,125 A | 12/1965 | Schulz | |
| 3,409,413 A | 11/1968 | Burns et al. | |
| 3,607,107 A * | 9/1971 | Ayers | C01G 43/00 222/463 |
| 3,813,464 A * | 5/1974 | Ayers | C01G 43/00 423/20 |
| 3,832,439 A | 8/1974 | Carter, Jr. | |
| 4,765,958 A | 8/1988 | Tygat et al. | |
| 4,784,823 A | 11/1988 | Holtmann et al. | |
| 5,190,623 A | 3/1993 | Sasaki et al. | |
| 2016/0348254 A1 * | 12/2016 | Almond | G21C 19/46 |

FOREIGN PATENT DOCUMENTS

| | | | |
|---|---|---|---|
| CN | 103778983 | | 5/2014 |
| GB | 1024751 | * | 4/1966 |
| RU | 2079907 | | 5/1997 |
| RU | 2013-130120 | * | 1/2015 |

OTHER PUBLICATIONS

Abstract of Russian Patent—RU2400846, Sep. 27, 2010, 1 page.

* cited by examiner

*Primary Examiner* — Steven Bos
(74) *Attorney, Agent, or Firm* — Dority & Manning, PA

(57) ABSTRACT

A process for controlling the dissolution of a metal in an acid bath is described. The metal may comprise aluminum and the acid bath may contain a metal catalyst that causes the metal to dissolve. In order to control the rate of dissolution and/or the amount of gas evolved during the process, an iron source is added to the bath. In one embodiment, the process can be used to dissolve aluminum contained in spent fuel assemblies for recovering a nuclear fuel, such as uranium.

21 Claims, 3 Drawing Sheets

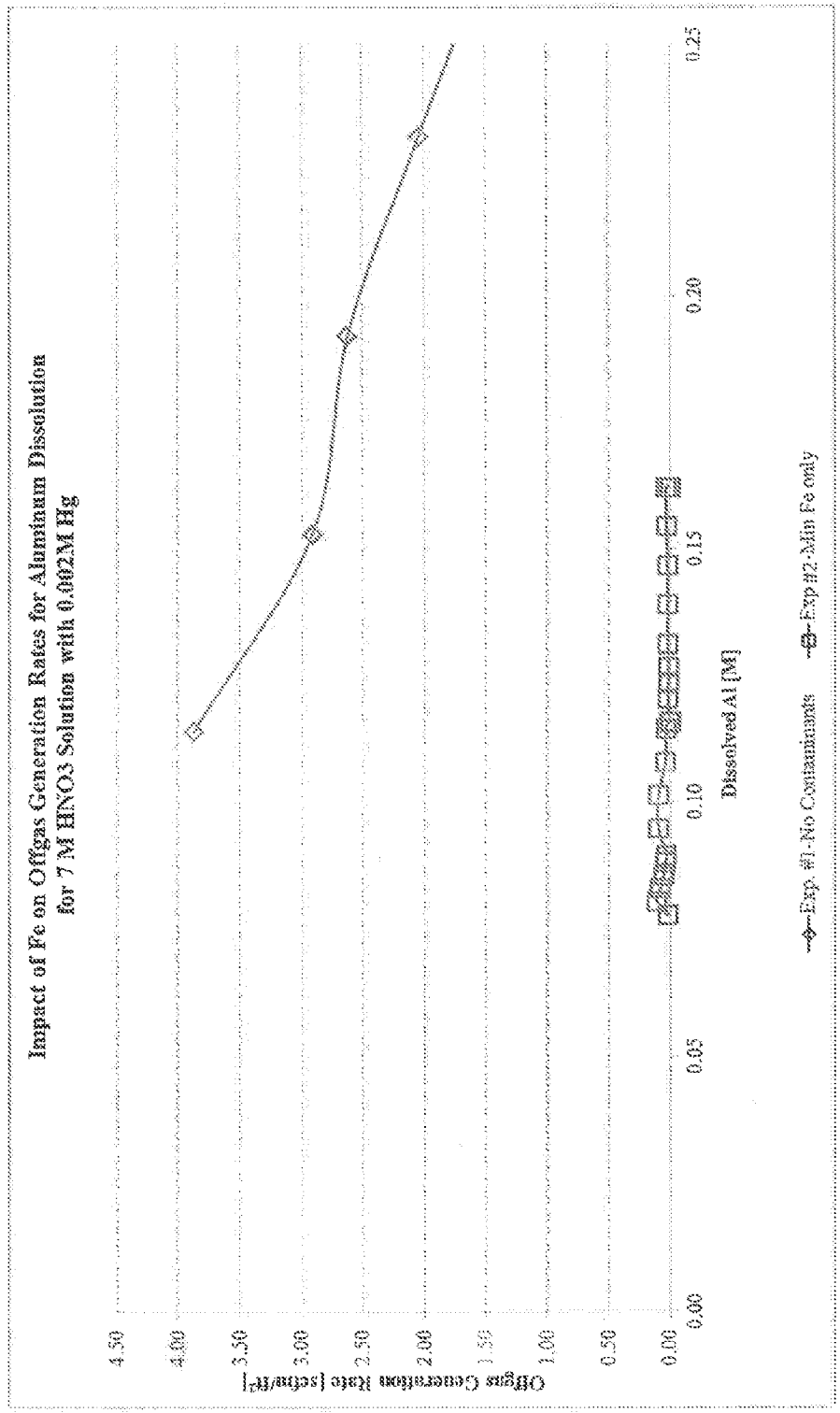
Figure 1. Impact of Fe on Offgas Generation for 0.002M Hg solution

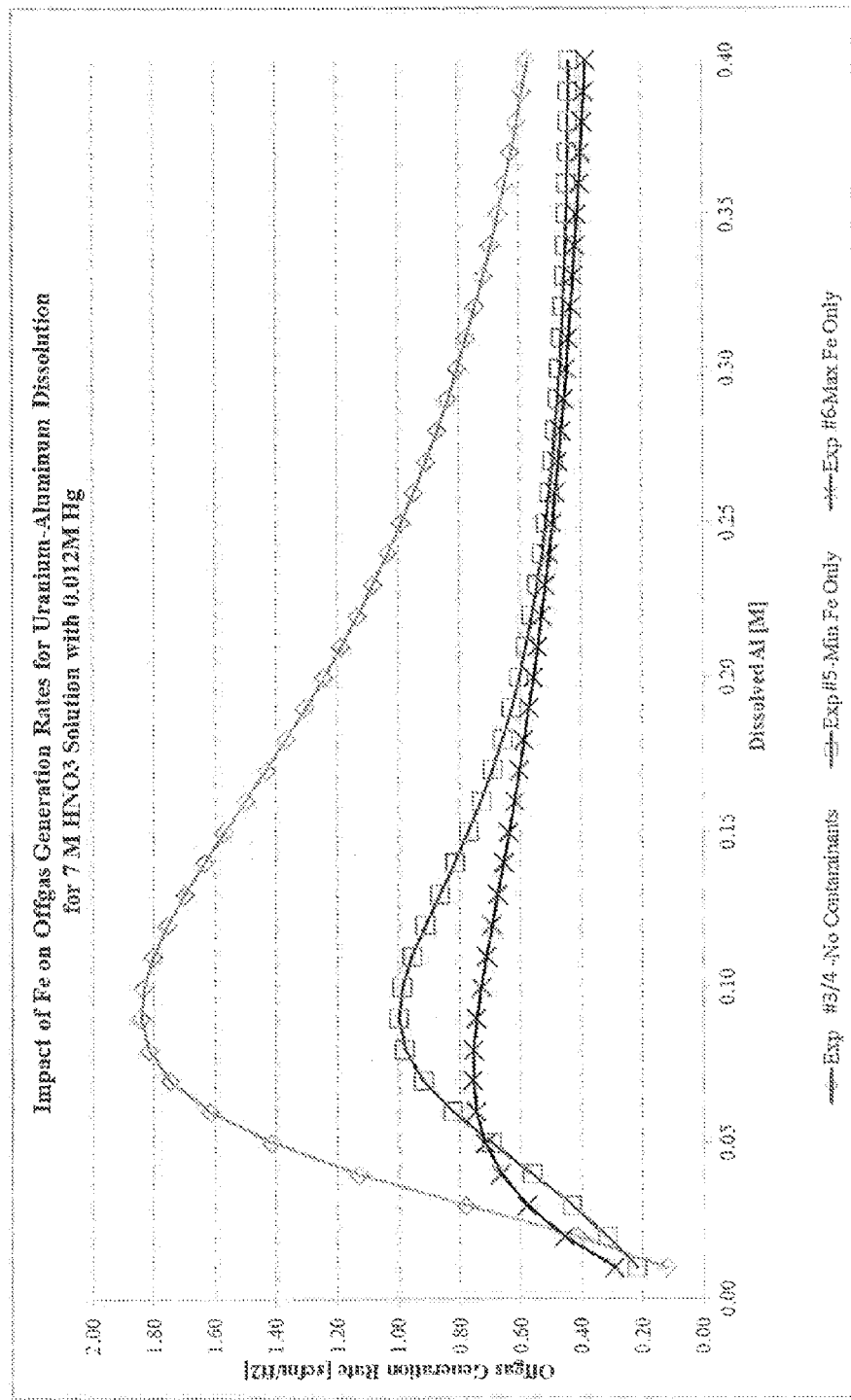
Figure 2. Impact of Fe on Offgas Generation Rates for U-Al Dissolution with 0.012M Hg

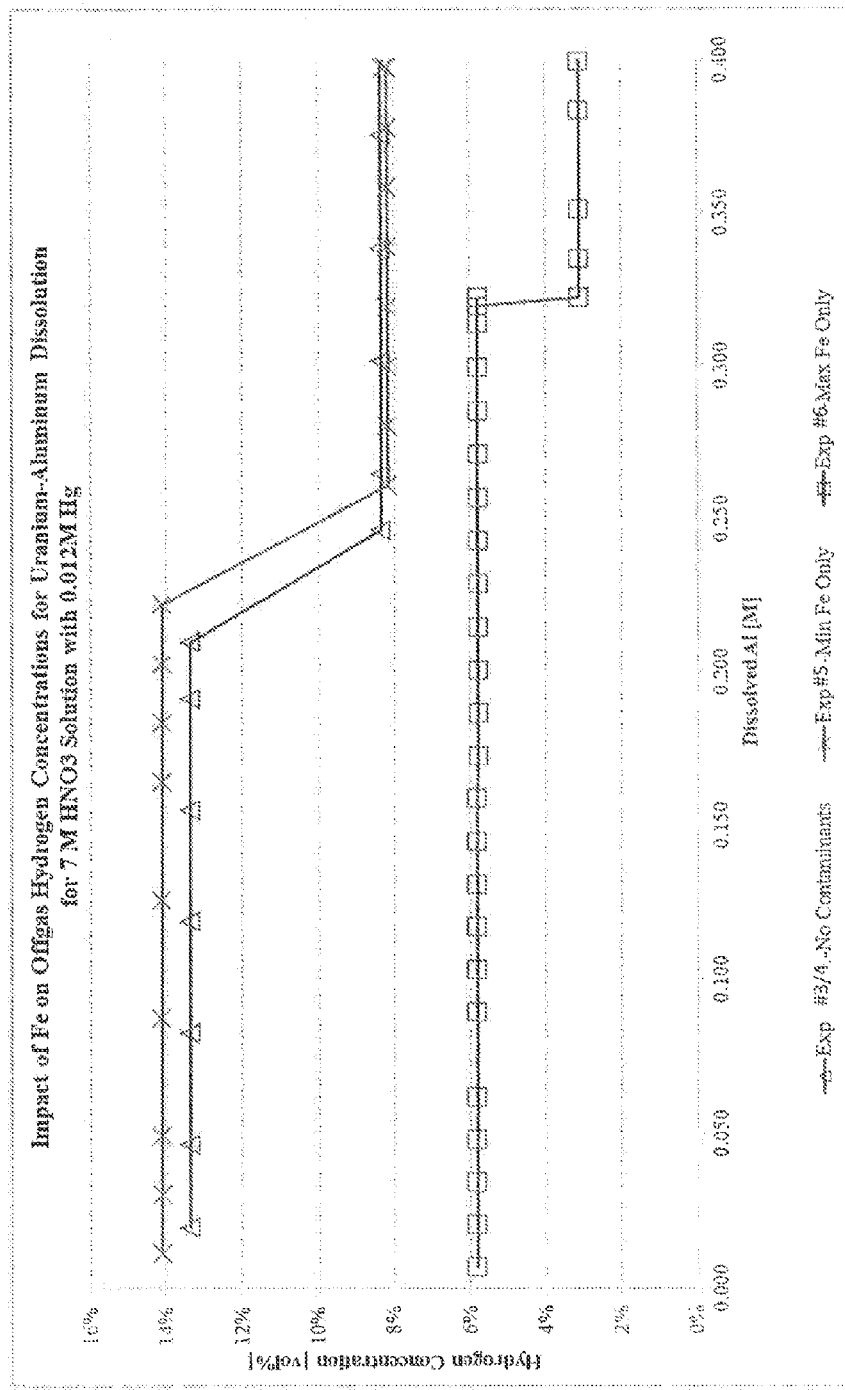
Figure 3. Impact of Fe on Offgas Hydrogen Concentrations for U-Al Dissolution with 0.012M Hg

PROCESS FOR DISSOLVING ALUMINUM FOR RECOVERING NUCLEAR FUEL

BACKGROUND

A unique characteristic of nuclear energy is that used fuel may be separated from other components and reused as new fuel. For instance, the nuclear materials contained in a spent rod from a nuclear power plant can be reprocessed and reused to produce new fuel rods. Practically all nuclear materials, including uranium and plutonium, can be reprocessed in this manner.

Fuel elements, including fuel rods in nuclear reactors, become unusable not so much on account of actual depletion of the fissionable fuel values, but because of the accumulation within the element of fission products. These fission products can interfere with the neutron flux within the reactor. Consequently, fuel elements are withdrawn from the reactor long before the fuel values are anywhere near to being completely consumed. The withdrawn or used nuclear fuel (sometimes referred to as spent fuel rods) have significant fuel value. At the same time, it is desirable to recover the valuable by-products of reactor operation, the transmutation products such as plutonium, which is a fissionable fuel, and certain isotopes of the fission products which are useful in many different fields and have many different applications.

Many research reactor fuel assemblies or fuel plates contain a nuclear material in combination with aluminum, such as a uranium-aluminum alloy or a uranium aluminide dispersed in a continuous aluminum phase. Aluminum is also widely used as a fuel element cladding material because it has a relatively low neutron absorption cross-section and has excellent physical and chemical properties. One type of aluminum used as a cladding material includes 1100 aluminum. Other alloys include 6061 and 6063.

A conventional process for recovering nuclear materials from used nuclear fuel is a dissolution process during which the aluminum material is dissolved. In one embodiment, the process for recovering fissionable materials is an aqueous process during which the fuel elements are dissolved in an acidic solution. Fuel elements containing an aluminum-uranium alloy contained in aluminum cladding, for instance, may be dissolved in a mercury-catalyzed, nitric acid flow-sheet. After the fuel is dissolved in the solution, the uranium can be recovered from the aluminum and fission products. The dissolution process must be carefully controlled to ensure that the used nuclear fuel dissolves at an acceptable rate without producing unacceptable amounts of off-gas.

The off-gas generation rate during nuclear fuel dissolution changes depending upon many factors. Thus, the off-gas generation rate is never constant. Off-gases that are produced include nitrogen oxides, hydrogen gas, in addition to volatile fission product gases, such as krypton, xenon and iodine vapor. The mechanisms that impact off-gas concentrations and species that produce the above gases during the course of dissolution are complex and are not well understood. Spikes in the generation of off-gases, however, can produce significant amounts of hydrogen gas which may drift above safety levels in the processing plant.

In the past, various processes have been proposed in order to control the generation of off-gases. For instance, U.S. Pat. No. 3,119,658 to Schulz, which is incorporated herein by reference, suggests that the rate of reactions during dissolution can be controlled by adding small amounts of nickelous nitrate or nickel II ion. The process proposed in the '658 patent, however, has had limited success.

Consequently, a need exists for a method or process of decreasing the off-gas generation rate or hydrogen gas concentration in the off-gas during used nuclear fuel dissolution processes. Controlling the off-gas rate and/or the amount of hydrogen gas being produced can significantly increase throughput and efficiency.

SUMMARY

In general, the present disclosure is directed to a process for controlling the dissolution of aluminum in an acid bath. More particularly, the process of the present disclosure is directed to dissolving aluminum under controlled conditions in order to positively affect off-gas production during the process. For instance, in one embodiment, the rate at which hydrogen gas evolves during the process can be controlled and reduced. The process of the present disclosure can be used to reduce the rate at which hydrogen gas is created, reduce the amount of hydrogen gas concentration in the off-gas during the process, and/or reduce the total amount of hydrogen gas that is produced during the process.

In one embodiment, the present disclosure is directed to a process for dissolving aluminum during the recovery of a nuclear fuel. The process includes the steps of contacting a material containing aluminum and a nuclear fuel with an acid in the presence of a metal catalyst and an iron source. The acid and metal catalyst dissolve the aluminum. In accordance with the present disclosure, the iron source is present in an amount sufficient to decrease hydrogen off-gas production during dissolution. For instance, in one embodiment, the iron source is present in an amount sufficient to decrease the rate at which hydrogen gas is produced during the process. For instance, in one embodiment, the hydrogen gas production rate is controlled using a purge gas such that the off-gas contains a hydrogen concentration of less than about 4% by volume at all times; although, a fraction of this concentration (e.g., 60%) is sometimes required as an additional safety constraint.

In one embodiment, the acid, metal catalyst and iron source comprise a dissolution mixture or solution. The acid, for instance, may comprise nitric acid. The metal catalyst, on the other hand, may comprise mercury. In one embodiment, the initial nitric acid concentration in the dissolution solution can be from about 4 molar to about 15 molar, such as from about 5 molar to about 8 molar. The mercury concentration, on the other hand, can be from about 0.001 molar to about 0.02 molar. During the process, at least about 80%, such as at least about 90%, such as at least about 95% of the aluminum is dissolved. In one embodiment, for instance, substantially all of the aluminum is dissolved. After the aluminum is dissolved, the final nitric acid concentration is generally not less than about 0.5 molar.

Various different iron sources may be used to supply iron ions during the process. The iron source, for instance, may comprise a ferrous metal or any suitable ferrous or ferric iron salt. In one embodiment, for instance, ferrous sulfamate or ferric nitrate may be added to the acid and metal catalyst.

The iron source may be present in the dissolution solution at a concentration of up to and greater than about 1.0 g/L, such as greater than about 2.5 g/L, such as greater than about 4 g/L, such as greater than about 6 g/L, such as greater than about 8 The iron concentration is generally less than about 20 g/L, such as less than about 18 g/L, such as less than about 16 g/L, such as less than about 14 g/L, such as less than about 12 g/L, such as less than about 10 g/L.

The amount of iron added during the process is generally proportional to the amount of metal catalyst in order to control off-gas production. For instance, the molar ratio between iron and the metal catalyst is generally greater than about 3:1, such as greater than about 5:1, such as greater than about 7:1, such as greater than about 9:1, such as greater than about 11:1. The iron to metal catalyst molar ratio is generally less than about 40:1, such less than about 30:1, such as less than about 20:1, such as less than about 18:1, such as less than about 15:1. In one embodiment, an amount of excess iron is added that is large enough to nearly stop or stop the reaction completely.

In one embodiment, the nuclear fuel combined with the aluminum may comprise used or spent nuclear fuel. The nuclear fuel may comprise uranium, plutonium, or mixtures thereof. In one embodiment, the material being dissolved may comprise a research reactor fuel assembly or fuel plate containing an aluminum-uranium alloy or uranium aluminide dispersed in a continuous aluminum phase surrounded by an aluminum cladding. After the aluminum-containing fuel is dissolved during the process, the process can further include the step of separating the nuclear fuel from the aluminum. The nuclear fuel can then be collected and reused. For instance, the nuclear fuel can be used to produce new fuel elements or fuel rods.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIGS. 1 through 3 are a graphical representation of the results obtained in the examples below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a method for controlling the dissolution of a metal, particularly aluminum or alloys of aluminum, such as U—Al alloy, during a process for dissolving the metal. As will be explained in greater detail below, the method of the present disclosure can be used to control the rate at which the metal dissolves, can control the amount of gases produced during the dissolution process and/or can be used to reduce the amount of off-gases produced during the process. Although the teachings of the present disclosure can be used in numerous and diverse applications, in one embodiment, the method of the present disclosure is used to control off-gas production during the recycling of used nuclear fuel.

Research reactor fuel assemblies or fuel plates are typically comprised of an aluminum cladding surrounding a nuclear fuel. The nuclear fuel may comprise uranium, plutonium, and mixtures thereof. In one embodiment, the research reactor fuel assemblies or fuel plates contains an aluminum-uranium alloy or uranium aluminide dispersed in a continuous aluminum phase contained in the aluminum cladding. Spent research reactor fuel assemblies or fuel plates still contain a significant amount of reusable nuclear fuel. In order to reuse the nuclear fuel, in one embodiment, the aluminum-containing fuel is dissolved in an acid in the presence of a metal catalyst which allows the nuclear fuel to be separated from the aluminum.

In one embodiment, for instance, the recovery of fissionable materials comprises the dissolution of fuel assemblies in an acid bath. The acid bath contains a dissolution solution that is comprised of an acid and a metal catalyst. One or more fuel assemblies are slowly lowered into the dissolution solution while the solution is at an elevated temperature. In one embodiment, the acid bath contains nitric acid with a mercury catalyst to dissolve the aluminum/uranium and allow the recovery of the uranium from the aluminum and fission products. In the past, the dissolution process was carefully controlled to make sure that the fuel element dissolved at an acceptable rate while preventing excessive dissolution and off-gas generation. In particular, during the dissolution process, hydrogen gas is produced. For safety reasons, the rate at which hydrogen gas is produced should be controlled.

The off-gas generation rate during fuel dissolution changes depending upon many factors. In general, the off-gas generation rate is fastest at low dissolved aluminum concentrations, which is typically when the process is initiated. Furthermore, the mechanisms that impact off-gas concentrations and species that produce gases such as nitrogen oxides and hydrogen during the course of the dissolution are complex and not well understood. Decreasing the off-gas generation rate or hydrogen concentration in the off-gas during fuel dissolution, and particularly during the initial phase of fuel dissolution, is desirable as it will allow for additional fuel assemblies to be simultaneously charged to a dissolver, which can dramatically improve efficiency.

The present inventors discovered that iron (iron ions) can be used as an additive to control and slow the dissolution rate and/or control and slow the off-gas generation rates when fuel elements are dissolved using a mercury catalyzed acid solution. During the dissolution process, mercury ions are reduced to elemental mercury on the surface of the aluminum. An amalgamation of the aluminum with the mercury then forms on the surface which subsequently dissolves in a heated nitric acid solution, such as a boiling solution. The mercury is reoxidized by the nitric acid, which regenerates the mercury ions. The addition of iron has a remarkable and dramatic effect in reducing the effectiveness of the mercury catalyst. Controlling the iron concentration in conjunction with the mercury concentration thus allows for more control over the process.

The addition of iron to the dissolution solution can provide numerous benefits. As described above, the presence of iron can be used to control the rate at which aluminum is dissolved and the rate at which off-gases are produced. Addition of iron can reduce the hydrogen concentration in the off-gas. Of particular advantage, the effectiveness of iron in reducing the dissolution rate and the off-gas rate is effective even in the presence of other impurities. In addition, the nuclear fuel can be separated from the dissolved iron and aluminum.

In accordance with the present disclosure, any suitable iron source can be fed to the dissolution solution or acid bath in order to control the rate at which aluminum dissolves and/or the rate of off-gas generation, and particularly the rate of hydrogen gas generation. In general, any suitable iron source can be used that provides iron ions to the process without interfering with the process or producing any unwanted contaminants either in the dissolution solution or in the off-gas stream. In one embodiment, for instance, the iron source comprises elemental iron or an iron metal. Alternatively, an iron salt may be added. The iron salt may be a ferric salt or a ferrous salt. The iron salt, for instance, may comprise iron sulfamate or iron nitrate. Other iron salts that may be used in accordance with the present disclosure include iron fluoride, iron sulfate, iron phosphate, iron chloride, iron bromide, iron perchlorate, iron acetate, iron hydroxide, iron carbonate, etc., and mixtures thereof.

The amount of the iron source that is added to the dissolution solution can depend on various factors. The amount, for instance, may depend upon the desired result, the concentration of the acid in the bath, and the concentration of the catalyst. In general, an iron source is added to the dissolution solution in an amount greater than about 1 g/L, such as greater than about 2 g/L, such as greater than about 3 g/L, such as greater than about 4 g/L, such as greater than about 5 g/L, such as greater than about 6 g/L, such as greater than about 7 g/L, such as greater than about 8 g/L. The iron source is added to the dissolution solution in an amount generally less than about 30 g/L, such as less than about 25 g/L, such as less than about 20 g/L, such as less than about 15 g/L, such as less than about 12 g/L.

In one embodiment, the iron source is added to the dissolution solution in an amount based upon the amount of metal catalyst present. For example, the iron source may be added to the dissolution solution such that the molar ratio of iron to the metal catalyst (i.e. mercury concentration) can be generally greater than about 3:1, such as greater than about 6:1, such as greater than about 8:1, such as greater than about 10:1, such as greater than about 12:1, such as greater than about 14:1. The molar ratio of iron to metal catalyst is generally less than about 30:1, such as less than about 25:1, such as less than about 20:1, such as less than about 18:1, such as less than about 16:1, such as less than about 14:1.

The amount of metal catalyst contained in the dissolution solution generally ranges from 0.001 to 0.02 molar. In general, the metal catalyst, such as mercury, is present in the dissolution solution in an amount greater than about 0.001 molar, such as greater than about 0.002 molar, such as greater than about 0.01 molar. The catalyst concentration is generally less than about 0.1 molar, such as less than about 0.08 molar, such as less than about 0.06 molar, such as less than about 0.04 molar, such as less than about 0.02 molar.

The acid present in the dissolution solution comprises any suitable acid capable of dissolving the aluminum in the presence of the metal catalyst. In one embodiment, nitric acid is used. The nitric acid should be heated in the presence of the catalyst up to or near boiling. For instance, the nitric acid can be heated to within about 10° C. of its boiling point. Alternatively, the nitric acid may be heated near to or at its boiling point. As aluminum dissolves, the nitric acid is consumed during the process releasing off-gases, such as nitrogen oxides and hydrogen. In one embodiment, as the process proceeds, the molar concentration of nitric acid decreases. In one embodiment, the initial molar concentration of nitric acid in the dissolution solution prior to beginning the process is greater than about 3 molar, such as greater than about 5 molar, such as greater than about 7 molar, such as greater than about 9 molar. The initial nitric acid concentration is generally less than about 16 molar, such as less than about 15 molar, such as less than about 12 molar, such as less than about 10 molar, such as less than about 9 molar. In one embodiment, the initial concentration of the nitric acid is from about 5 molar to about 8 molar.

The lowest or final concentration of nitric acid in the dissolution solution can depend upon various factors. In one embodiment, for instance, greater amounts of nitric acid can be added to the solution as the aluminum dissolves. In a batch process, however, the process will continue until virtually all of the aluminum has dissolved. In this embodiment, the final nitric acid concentration can be less than about 2 molar, such as less than about 1.5 molar, such as less than about 1 molar, such as no less than about 0.5 molar. During the process, at least 95%, such as at least 96%, such as at least 97%, such as at least 98%, such as even at least 99% of the aluminum is dissolved.

By adding an iron source into the dissolution solution during the process, the rate at which the aluminum dissolves, the rate at which off-gases are produced, the rate at which hydrogen gas is produced, the total amount of off-gas produced, and/or the total amount of hydrogen gas that is produced during the process may be reduced. The iron source can be present during the entire process or may be added to the process at selective times. For instance, in one embodiment, an iron source may be present during initial dissolution of the metal or aluminum. In one embodiment, the iron source is used to decrease the rate at which hydrogen gas is produced by at least 10%, such as by at least 20%, such as by at least 30%, such as by at least 40%, such as even by at least 50%. The above reductions can also relate to the total amount of hydrogen gas produced and/or may relate to the peek hydrogen gas production rates and are in comparison to an identical process not containing the iron source.

Ultimately, an off-gas stream using a purge gas can be produced that contains hydrogen gas in an amount less than 4% by volume, such as in an amount less than 3.8% by volume, such as in an amount less than about 3.6% by volume, such as in an amount less than about 3.4% by volume, such as in an amount less than about 3.2% by volume during the entire process.

The process of the present disclosure is particularly well suited to processing used nuclear fuel. For instance, spent fuel assemblies or fuel plates can be lowered slowly into the dissolution solution for dissolving the aluminum and nuclear materials. After the fuel and cladding are dissolved, the aluminum can be separated from the nuclear fuel which may comprise uranium, plutonium, or mixtures thereof. By controlling the off-gas rate and particularly hydrogen gas production, greater amounts of the spent fuel assemblies or fuel plates may be processed simultaneously, dramatically improving the efficiency of the process.

The present disclosure may be better understood with reference to the following examples.

EXAMPLES

Example 1

Single-impurity scoping experiments to determine the influence of individual contaminants on off-gas rate were initially performed using Al-1100 alloy coupons. A series of four Al-1100 coupons were cut to the approximate dimensions of 19×11×3 mm. A ¹⁄₁₆ inch hole was drilled into each coupon in order to fasten each coupon to the glass rods used to lower them into a dissolving nitric acid solution. The coupons were lightly sanded, washed with soap and water, and then weighed and measured. Each coupon weighed approximately 1.7 g and had a surface area of approximately 6 cm². Each coupon was tied by Teflon™ string through the 1116 inch hole to a glass rod on the dissolver apparatus that was labeled with the coupon position number for coupon identification.

A dissolver apparatus and off-gas collection system were assembled in a chemical hood. The dissolver apparatus contained a boiling flask with multiple ports, a condenser, an in-line gas sample glass bulb, and a water-submerged gas collection Tedlar™ bag. Glass rods were arranged to allow for attachment of alloy coupons and penetration of the lid of the boiling flask. Compressed O-ring fittings were present for subsequent sealing of the glass rods, allowing for dissolution of all 4 coupons without breaking the gas-sealed system by lowering each glass rod sequentially over the duration of the experiment. Removable glass bulbs were included in the assembly for sampling of the $H_2$ concentration. Tedlar™ bag systems were used for measurement of the gas generation rate through water displacement in a graduated column. A second apparatus was placed in a radiological hood for conducting experiments with U—Al alloys.

Experiment 1 was conducted using a dissolving solution of 7 M $HNO_3$, 0.1 M KF, and 0.002 M Hg, and no contaminants. Nominally 150 mL of dissolving solution was weighed, added to a flask containing a Teflon™ stir bar, and then sealed. The dissolution vessel and off-gas collection system (including 8 sample glass bulbs) were leak checked by filling the system with Ar to inflate the Tedlar™ bag and observing a constant water column height over several minutes. The stir bar rotation was set at 325 rpm. The dissolving solution was then heated to 100° C. The off-gas system was vented to relieve pressure (to zero the off-gas collection system), and a stopwatch was started as the first of four Al-1100 coupons was lowered into the solution.

To measure the gas generation rate, time versus water displacement was manually recorded until the coupon was visually observed to have dissolved completely. For each coupon dissolution, a gas sample was taken generally at 450 mL of off-gas volume (about half of total gas produced for each coupon) and a second sample was taken after the coupon had completely dissolved. The collected gas in the Tedlar™ bag was then purged, leaving residual gas in the remainder of the void space of the apparatus. The procedure was repeated for the dissolution of coupons 2 through 4, producing a total of 4 off-gas generation rate data sets (1 per coupon), and 8 gas samples (2 per coupon) for each experiment.

Off-gas samples were analyzed for hydrogen concentration using gas chromatography. A 1 volume percent $H_2$ standard was used for determining the response factor for $H_2$.

Experiment 2 was conducted in a manner analogous to Experiment 1 using a dissolving solution of 7 M $HNO_3$, 0.1 M KF, and 0.002 M Hg, and an Fe contaminant (2.5 g/L). As shown in FIG. 1, the presence of even a small amount of Fe in the process reduced the rate of off-gas generation significantly when compared to the process with no Fe present.

Example 2

Another series of experiments were performed to determine the impact of Fe on off-gas generation rates for uranium-aluminum dissolution at higher concentrations of Hg. A series of four 30 wt % U—Al alloy coupons, cut to 20×12×3 mm with a mass of 1.6-2.1 g, were prepared as described in Example 1.

Experiment 3 was conducted using a method analogous to that of Example 1 with a dissolving solution of 7 M $HNO_3$, 0.1 M KF, 0.012 M Hg, and no Fe contamination. Hg was initially present in the solution, and the solution was heated to 100° C. before lowering the first coupon. The concentration of hydrogen in the off-gas was measured using gas chromatography.

Experiment 4 was conducted using a dissolving solution of 7 M $HNO_3$, 0.1 M KF, 0.012 M Hg, and no Fe contamination. Approximately 130 mL of dissolving solution was weighed and added to the dissolver flask containing a Teflon™ stir bar. The solution containing all components except Hg was then heated to 100° C. A syringe pump was then started to meter the Hg into the solution at the rate of 0.79 mL/min. The 10 mL Hg addition was completed during the first coupon dissolution, bringing the total concentration of Hg in the solution to 0.012 M. Off-gas generation rate and hydrogen concentration were measured in the manner described in Example 1.

Experiments 5 and 6 were conducted in the same manner as Experiment 4. Experiment 5 used a dissolving solution of 7.0 M $HNO_3$, 0.1 M K, 0.1 M F, and 2.5 g/L Fe. Experiment 6 used a dissolving solution of 7.0 M $HNO_3$, 0.1 M K, 0.1 M F, and 10 g/L. Fe. For each experiment, four 30 wt % U—Al coupons were dissolved in a dissolving solution to which Hg solution was added at a rate of 0.79 mL/rein to achieve a concentration of 0.012 M Hg in the solution. Off-gas generation rate and hydrogen concentration were measured in the manner described in Example 1.

Table 1 shows that Experiment 5 with 2.5 g/L Fe produced higher off-gas rates than did Experiment 6 with 10 g/L Fe. Table 2 demonstrates that Experiment 5 also produced higher concentrations of $H_2$ gas during the course of the dissolution than did Experiment 6.

TABLE 1

Measured Peak Off-gas Rates and Al Concentrations for Experiments 5 and 6 with 30 wt % U—Al Alloy.

| Coupon No. | Experiment 5 2.5 g/L Fe Peak Off-gas ($cm^3/min/cm^2$) | Initial [Al] (M) | Experiment 6 10 g/L Fe Peak Off-gas ($cm^3/min/cm^2$) | Initial [Al] (M) |
|---|---|---|---|---|
| Coupon 1 | 30.6 | 0 | 25.2 | 0 |
| Coupon 2 | 33.3 | 0.40 | 29.2 | 0.32 |
| Coupon 3 | 33.1 | 0.80 | 16.4 | 0.67 |
| Coupon 4 | 19.0 | 1.18 | 24.1 | 0.97 |
| All Coupons | — | 1.55 | — | 1.31 |

TABLE 2

Corrected $H_2$ Gas Concentration Measurements for Experiments 5 and 6 with 30 wt % U—Al Alloy.

| Gas Sample | Experiment 5 2.5 g/L Fe 30% U—Al $H_2$ (vol %) | Experiment 6 10 g/L Fe 30% U—Al $H_2$ (Vol %) |
|---|---|---|
| 1 | 14.1 | 5.8 |
| 2 | 8.2 | 5.8 |
| 3 | 8.3 | 3.1 |
| 4 | 8.4 | 3.7 |
| 5 | 3.8 | 2.8 |
| 6 | 7.8 | 1.8 |
| 7 | 5.3 | 3.7 |
| 8 | 5.4 | 2.4 |

Similar results are shown in FIGS. 2 and 3. Experiments 5 and 6, which were conducted with dissolving solutions including Fe concentrations of 2.5 (minimum) and 10 g/L (maximum), respectively, demonstrated a significantly lower off-gas generation rate for uranium-aluminum dissolution than did Experiments 3 and 4, which were conducted with dissolving solutions without Fe (FIG. 2). Experiment 6, with a dissolving solution containing the maximum Fe concentration, demonstrated a significantly lower $H_2$ concentration at all concentrations of dissolved Al than did either Experiments 3, 4, or 5 (FIG. 3).

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for dissolving aluminum during the recovery of a nuclear fuel comprising:
    contacting a material containing aluminum and a nuclear fuel with an acid in the presence of a metal catalyst and an iron source, the acid and metal catalyst dissolving the aluminum, the iron source being present in an amount sufficient to decrease an off-gas stream rate during the dissolving process.

2. A process as defined in claim 1, wherein the iron source is present in an amount sufficient to decrease hydrogen off-gas rate during the dissolving process.

3. A process as defined in claim 1, wherein the acid comprises nitric acid.

4. A process as defined in claim 3, wherein the material is initially contacted with nitric acid at a concentration of from about 4 molar to about 15 molar.

5. A process as defined in claim 3, wherein the material is initially contacted with nitric acid at a concentration of from about 5 molar to about 8 molar.

6. A process as defined in claim 1, wherein the iron source is present such that the molar ratio between iron and the catalyst is from about 3:1 to about 40:1.

7. A process as defined in claim 1, wherein the iron source is present such that the molar ratio between iron and the catalyst is from about 11:1 to about 20:1.

8. A process as defined in claim 3, wherein the nitric acid concentration after 95 wt % of the aluminum has dissolved is no less than 0.5 molar.

9. A process as defined in claim 2, wherein the iron source is present in an amount sufficient to decrease the rate of hydrogen off-gas production by more than 10% by volume of the total off-gas produced.

10. A process as defined in claim 2, wherein the iron source is present in an amount sufficient to decrease the rate of hydrogen off-gas production by more than 20% by volume of the total off-gas produced.

11. A process as defined in claim 1, wherein the metal catalyst comprises mercury.

12. A process as defined in claim 1, wherein the acid, the metal catalyst, and the iron source form a dissolution solution and wherein the metal catalyst comprises mercury and wherein mercury is present in the dissolution solution in an amount from about 0.001 molar to about 0.02 molar.

13. A process as defined in claim 1, wherein the iron source comprises a ferrous metal, a ferrous salt, a ferric metal, a ferric salt, or mixtures thereof.

14. A process as defined in claim 1, wherein the iron source comprises either ferrous sulfamate or ferrous nitrate.

15. A process as defined in claim 1, wherein the material containing aluminum and a nuclear fuel comprises used nuclear fuel.

16. A process as defined in claim 1, wherein the material containing aluminum and a nuclear fuel comprises an aluminum-uranium alloy or uranium aluminide dispersed in a continuous aluminum phase with an aluminum cladding.

17. A process as defined in claim 1, wherein the nuclear fuel comprises uranium, plutonium, or mixtures thereof.

18. A process as defined in claim 1, wherein the acid comprises nitric acid and the metal catalyst comprises mercury, the acid, metal catalyst and the iron source comprise a dissolution solution, the initial concentration of nitric acid in the dissolution solution being from about 5 molar to about 8 molar, the concentration of mercury being from about 0.001 molar to about 0.02 molar.

19. A process as defined in claim 1, wherein the iron source is present during the process so that hydrogen off-gas production is maintained below 4% by volume in the off-gas stream.

20. A process as defined in claim 1, wherein the acid, the metal catalyst and the iron source comprise a dissolution solution and wherein iron is present in the dissolution solution in an amount from about 2.5 g/L to about 20 g/L.

21. A process as defined in claim 1, wherein the iron source comprises iron nitrate, iron fluoride, iron sulfate, iron phosphate, iron chloride, iron bromide, iron perchlorate, iron acetate, iron hydroxide, iron carbonate, or mixtures thereof.

* * * * *

UNITED STATES PATENT AND TRADEMARK OFFICE
CERTIFICATE OF CORRECTION

PATENT NO. : 9,896,738 B2  
APPLICATION NO. : 14/724085  
DATED : February 20, 2018  
INVENTOR(S) : Philip M. Almond, William E. Daniel and Tracy S. Rudisill Page 1 of 1

It is certified that error appears in the above-identified patent and that said Letters Patent is hereby corrected as shown below:

In the Specification

At Column 1, Line 6:
The following statement should be inserted, following the title of the application:
--FEDERAL RESEARCH STATEMENT
This invention was made with government support under Contract No. DE-AC09-08SR22470 awarded by the U.S. Department of Energy. The government has certain rights in the invention.--

Signed and Sealed this
Fifteenth Day of May, 2018

Andrei Iancu
*Director of the United States Patent and Trademark Office*